(12) United States Patent  
Berthiaume (10) Patent No.: US 9,179,659 B1  
(45) Date of Patent: Nov. 10, 2015

(54) FISH BITE INDICATOR

(71) Applicant: Jordan Berthiaume, Berlin, CT (US)

(72) Inventor: Jordan Berthiaume, Berlin, CT (US)

(73) Assignee: The Fish Element LLC, Solebury, PA (US)

( * ) Notice: Subject to any disclaimer, the term of this patent is extended or adjusted under 35 U.S.C. 154(b) by 145 days.

(21) Appl. No.: 13/742,496

(22) Filed: Jan. 16, 2013

Related U.S. Application Data

(60) Provisional application No. 61/586,924, filed on Jan. 16, 2012.

(51) Int. Cl.  
*A01K 97/12* (2006.01)

(52) U.S. Cl.  
CPC .................... *A01K 97/125* (2013.01)

(58) Field of Classification Search  
CPC ............. A01K 89/00; A01K 89/0122; A01K 89/0178; A01K 97/12; A01K 97/125  
USPC .......... 43/16, 17, 17.5, 25; 362/109, 190, 191  
IPC ............................................. A01K 89/00, 97/12  
See application file for complete search history.

(56) References Cited

U.S. PATENT DOCUMENTS

| | | | |
|---|---|---|---|
| 2,619,559 A * | 11/1952 | Schenkel | 200/61.18 |
| 2,631,792 A * | 3/1953 | Morrison | 242/323 |
| 2,791,857 A | 5/1957 | Schrader | |
| 2,814,900 A | 12/1957 | Frazier | |
| 2,876,579 A | 3/1959 | Plouffe | |
| 4,118,882 A * | 10/1978 | Gorsky | 43/17 |
| 4,660,316 A | 4/1987 | Gamelin | |
| 5,303,133 A * | 4/1994 | Wagner | 362/157 |
| 5,488,796 A | 2/1996 | Taylor et al. | |
| 5,524,831 A * | 6/1996 | Carlson | 242/223 |
| 5,881,488 A | 3/1999 | Canepa | |
| 6,193,387 B1 * | 2/2001 | Schlichting | 362/109 |
| 6,220,538 B1 | 4/2001 | Durso | |
| 7,100,323 B1 * | 9/2006 | Bogess | 43/17.5 |
| 7,347,607 B1 | 3/2008 | Hook | |
| 7,523,882 B2 | 4/2009 | Priednieks | |
| 8,201,960 B2 * | 6/2012 | Ortega | 362/99 |
| 2008/0232097 A1 * | 9/2008 | Gandhi et al. | 362/191 |

* cited by examiner

*Primary Examiner* — Lisa Tsang  
(74) *Attorney, Agent, or Firm* — Invention To Patent Services; Alex Hobson (57) ABSTRACT

A fish bite indicator that provides an indication of the fishing line being pulled from the reel during night-time or low light conditions is described. The fish bite indicator has a light source attachment feature that is configured on the spinning portion of the reel, such as the reel top. When a fish bites the lines and pulls the fishing line from the reel, the reel spins and the spinning light is clearly visible to a nearby angler. The fish bite indicator is detachably attachable to a reel in some embodiments. In other embodiments, the fish bite indicator has a body forming an enclosure around the light source with one or more openings in the body. The light projected from the openings creates a repetitive flash when the reel spins. A glow-stick type or LED light may be used with the fish bite indicator described.

16 Claims, 12 Drawing Sheets

FISH BITE INDICATOR

CROSS REFERENCE TO RELATED APPLICATIONS

This application claims the benefit of U.S. provisional patent application No. 61/586,924 filed on Jan. 16, 2012 and entitled FISH LIGHT, the entirety of which is incorporated by reference herein.

BACKGROUND OF THE INVENTION

1. Field of the Invention

The present invention relates to fish bite indicators and specifically fish bite indicators that utilize a light source attached to a fishing reel.

2. Background

Fishing at night, or in low light conditions, makes it difficult to determine when a fish has taken the line. There are any number of fish bite indicators available to anglers that indicated when the fishing pole bends or moves. A light may be clipped to the fishing pole tip to more clearly indicate when the tip of the pole is moving. This type of indicator may be misleading however, especially when used on the surf, where waves cause the tip of the pole to bend and move. An alternative it so attach a bell to the tip of the fishing rod, which can also be misleading and difficult to hear in noisy environments.

SUMMARY OF THE INVENTION

The invention is directed to a fish bite indicator that provides an indication of the fishing line being pulled from the reel. The fish bite indicator of the present invention comprises a light source attachment feature that is configured on the spinning portion of the reel, such as the reel top. When a fish bites the line and pulls it from the reel, the reel spins and the spinning light is clearly visible to a nearby angler. The motion of the light source spinning will alert the fisherman that a fish is taking the fishing line. A light source attachment feature may comprise any suitable type or combination of attachment devices including, but not limited to, clips, holders, spring retainers or clips, screws, fastener, straps, bands and the like.

The fish bite indicator may comprise one or more light sources. Any suitable type of light source may be used including, but not limited to, a chemical glow-stick, a light, such as an incandescent or LED light. In some embodiments, a glow-stick is preferred as it is waterproof and requires no batteries. A glow-stick will glow for a period of time after being activated, such as by being shaken or bent.

The light source may be elongated, having a length that is at least 1.5 times greater in dimension than the width or diameter. A glow-stick for example may be 1.5 inches long by 0.25 inches in diameter or less. A light source may be configured with the length direction substantially parallel with the plane of rotation of the reel, or put another way, aligned with the top face of the reel.

A fish bite indicator may be configured as an integral part of a fishing reel, whereby the light source attachment feature is formed as part of the reel and is not detachable from the reel or reel top. A reel manufacturer may have a light source indicator formed with the reel top during manufacturing, for example.

A fish bite indicator may be a configured to be detachably attached to a fishing reel and comprise at least one reel attachment feature. Any suitable type reel attachment feature may be used including, clips, attachment extensions, magnets, threads, interference fit features and the like. For example, the fish bite indicator as described herein may comprise a reel attachment feature comprising a plurality of attachment extensions that clip to the outer diameter of the reel top. The extensions may be substantially flexible to allow attachment to reels of various diameters. In another embodiment, a fish bite indicator may comprise a plurality of radial extensions, whereby the fish bite indicator may be configured over the reel top and rotated to attach thereto. Attachment extensions may have any suitable length including, but not limited to, greater than about 0.25 inches, greater than about 0.5 inches, greater than about 0.75 inches, greater than about 1.0 inch, greater than about 1.5 inch, greater than about 2.0 inch and any range between and including the length values provided. In yet another embodiment, a magnet is used to secure the fish bite indicator to a reel, whereby a portion of a light source attachment feature, or reel attachment feature is configured between the magnet and the reel. Any suitable type and combination of attachment features may be configured on a fish bite indicator. Any suitable number of attachment extensions may be configured on a fish bite indicator, such as one, two, three, more than four, more than six and the like.

A fish bite indicator of the present invention may comprise a body having sides that define an interior volume, wherein a light source is configured for attachment therein. The sides may substantially have no light transmission therethrough. A body may have one or more opening in a side, whereby illumination from the light source may provide a flashing effect when the reel spins. An opening, for the purpose of allowing light transmission from the body of the invention, may have any suitable dimensions, including at least one dimension greater than about 0.125 inch, greater than about 0.25 inch, greater than about 0.5 inch, greater than about 0.75 inch, greater than about 1.0 inch, and any range between and including the opening dimensions provided. In an exemplary embodiment, the body is cylindrical in shape and comprises at least two openings in the cylindrical wall. Any number of openings may be configured in the side walls including, but not limited to one, two or more, three or more, four or more, six or more, ten or more and any range between and including the number of openings provided. In still another embodiment, the sides have at least one portion that is light translucent or transparent. For example, a body having a cylindrical shape may comprise a light blocking element configured over a portion of the side. A light blocking feature, may be a paint, pigment or filler, or may be a strip of material configured on the interior or exterior surface of the body, such as a sticker. For example, a body may be cylindrical in shape and one or more sticker may be attached along the interior surface of the body side wall to block the light, thereby leaving at least one portion of the sidewall that is translucent. The body, or a portion thereof may be at least translucent. A body may further comprise a cap and a cap may be detachably attachable to the body, whereby it snaps onto the body. In an exemplary embodiment, a hinge couples a cap to the body. A body may form an enclosure, comprising a base, sides and a cap, and this enclosure may be substantially waterproof.

A body may comprise reflective surfaces over a portion of the surface, such as the interior surface. For example, the interior side walls, and cap may comprise a reflective coating or other reflective material applied thereto. This reflective surface may enhance the amount of light being transmitted through openings or translucent portions of the body. In another embodiment, the fish bite indicator, as described herein comprises a Fresnel lens. For example, a Fresnel lens may be configured in the sides of the body. Furthermore, one or more light pipes, or tubes may be configured with the fish bite indicator of the present invention.

The fish bite indicator as described herein may be made out of any suitable type of combination of types of materials including, but not limited to, metal, plastic, elastomer, glass, composites and the like. In an exemplary embodiment, the fish bite detector is made out of plastic and is durable with repeated water contact. In another embodiment, the fish bite detector is a single piece unit, such as an injection molded part that is contiguous in nature. In another embodiment, the light source attachment, body and reel attachment features are all injection molded together and are a single piece unit.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
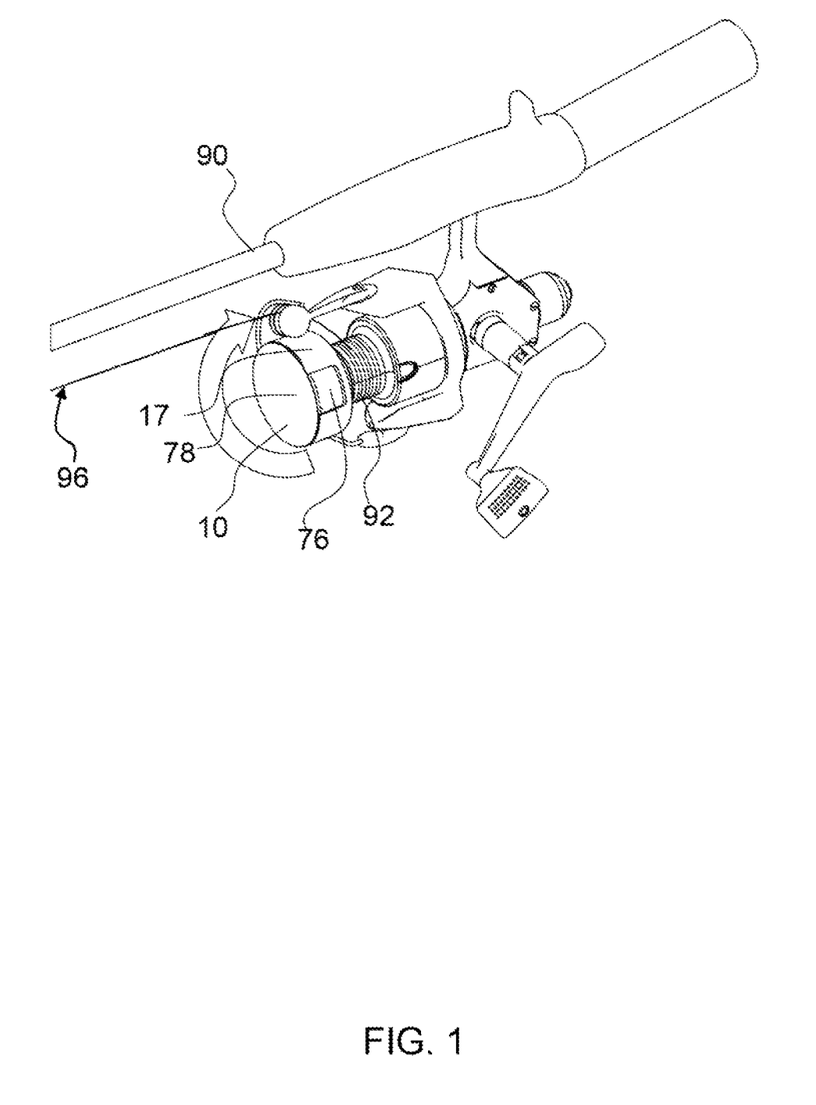
FIG. 1 shows an isometric view of an exemplary fish bite indicator attached to a fishing reel as described herein.

As shown in FIG. 1 an exemplary fish bite indicator 10 is attached to a fishing reel 92. The fish bite indicator 10 comprises a body 17 having an opening 76 and a cap 78. When a fish takes the fishing line 96, the reel 92 will spin to release the line and light shining through the opening 76 will flash as the reel spins to alert the angler. The plane of rotation of the reel is indicated by the large arrow.

Figure 2:
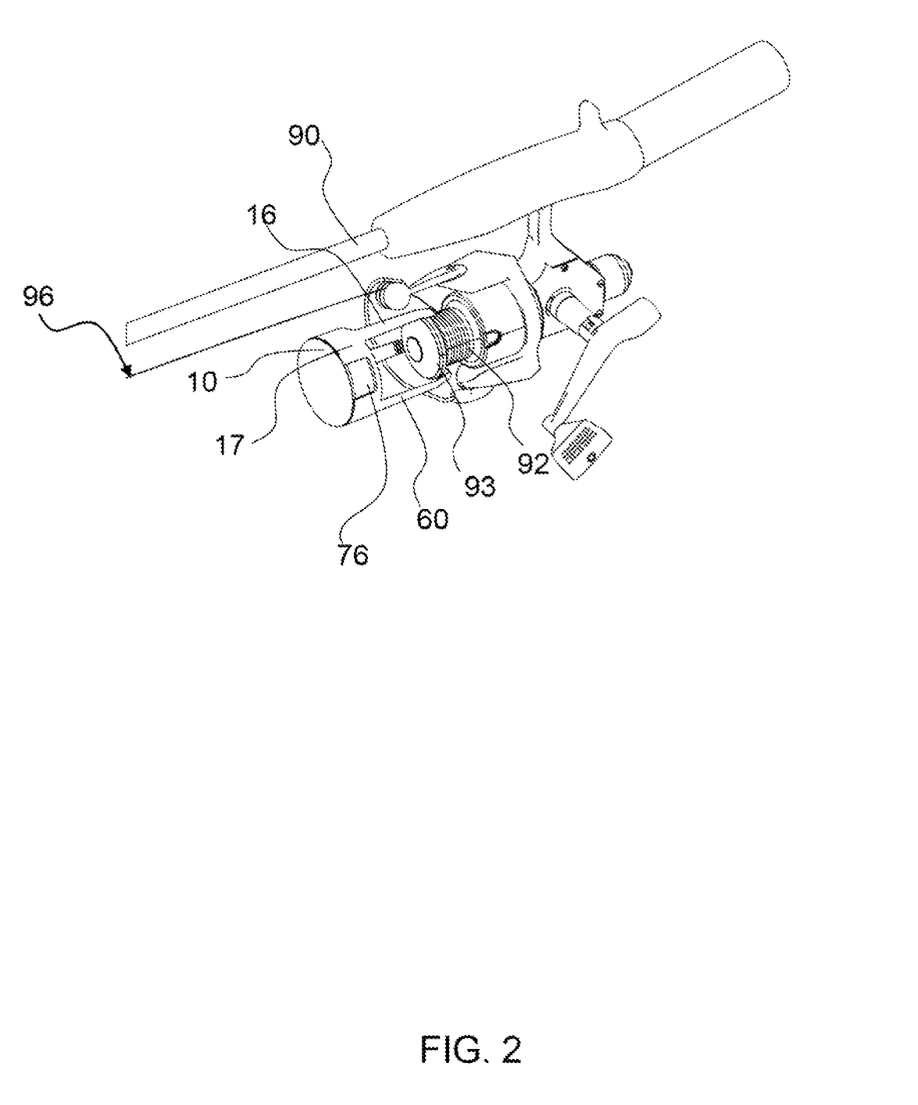
FIG. 2 shows an isometric view of an exemplary fish bite indicator attached to a fishing reel as described herein.

As shown in FIG. 2 an exemplary fish bite indicator 10 is attached to a fishing reel 92. The body 17 is attached to the reel top 93 by the reel attachment feature 16 comprising three attachment extensions 60. The attachment extensions may simply flex outward to clip onto the reel top as shown.

Figure 3:
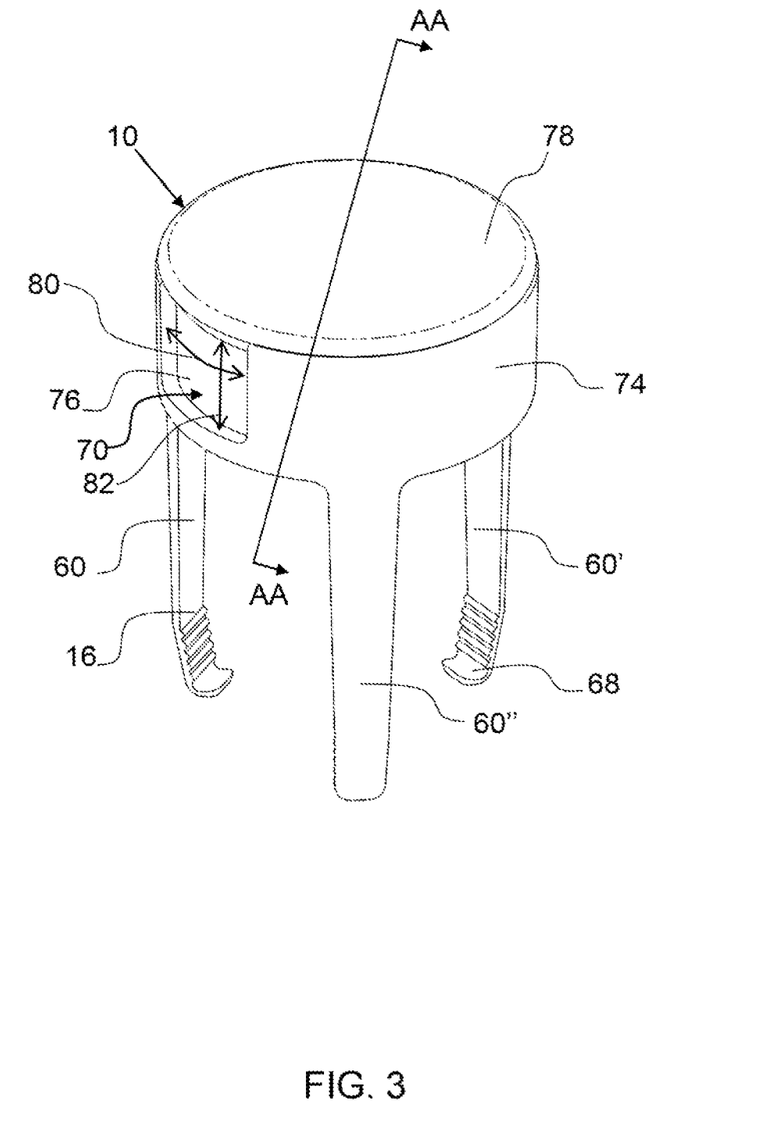
FIG. 3 shows an isometric view of an exemplary fish bite indicator having three attachment extension as described herein.

As shown in FIG. 3, an exemplary fish bite indicator 10 has three attachment extension. 60, 60' and 60" that extend down from the body in a direction substantially perpendicular to the plane of rotation. Each attachment extension comprises a retainer portion 68 that is configured to clip around the reel top and secure the fish bite indicator to the reel. Also shown in FIG. 3 are the opening 76 dimensions of width 80 and height 82. An opening should be sufficiently large enough to allow enough light transmission to allow detection by a nearby angler when the fish bite indicator spins.

Figure 4:
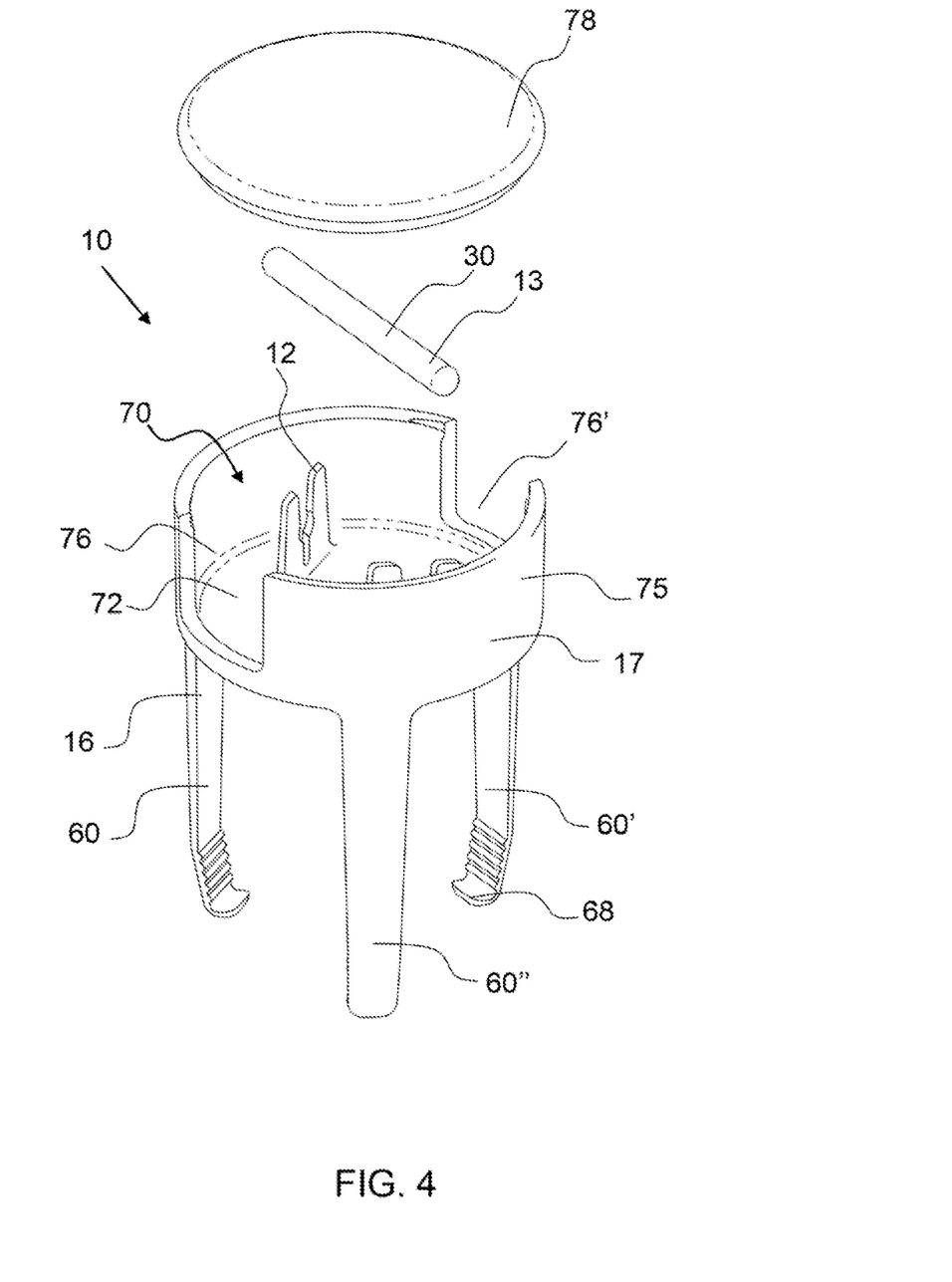
FIG. 4 shows an isometric exploded view of an exemplary fish bite indicator having a light source attachment feature configured within the interior volume of a body as described herein.

As shown in FIG. 4 an exemplary fish bite indicator 10 has a light source attachment feature 12 configured within the interior volume 70 of the body 17. The light source attachment feature comprises a plurality of clips, whereby the light source 13 can be inserted therein. The dip may simply flex slightly to allow for the insertion of the light source. In the exemplary embodiment, the clip 12 is flexible to allow secure attachment of light sources having various diameters. The clips extend vertically from the body base 72 and have a cut-out geometry having a smaller dimension at the top of the clip and a larger dimension there below for retaining a light source. The top portion of the clip may flex open to allow the insertion of a light source. As described, any suitable type of light source attachment feature may be used. In one embodiment, a spring loaded clamp is used to accommodate light sources of various sizes. The body 17 comprises cylindrical side walls 75 having two openings 76, 76' therein. A cap 78 may be snapped onto the body to further enclose the interior volume.

Figure 5:
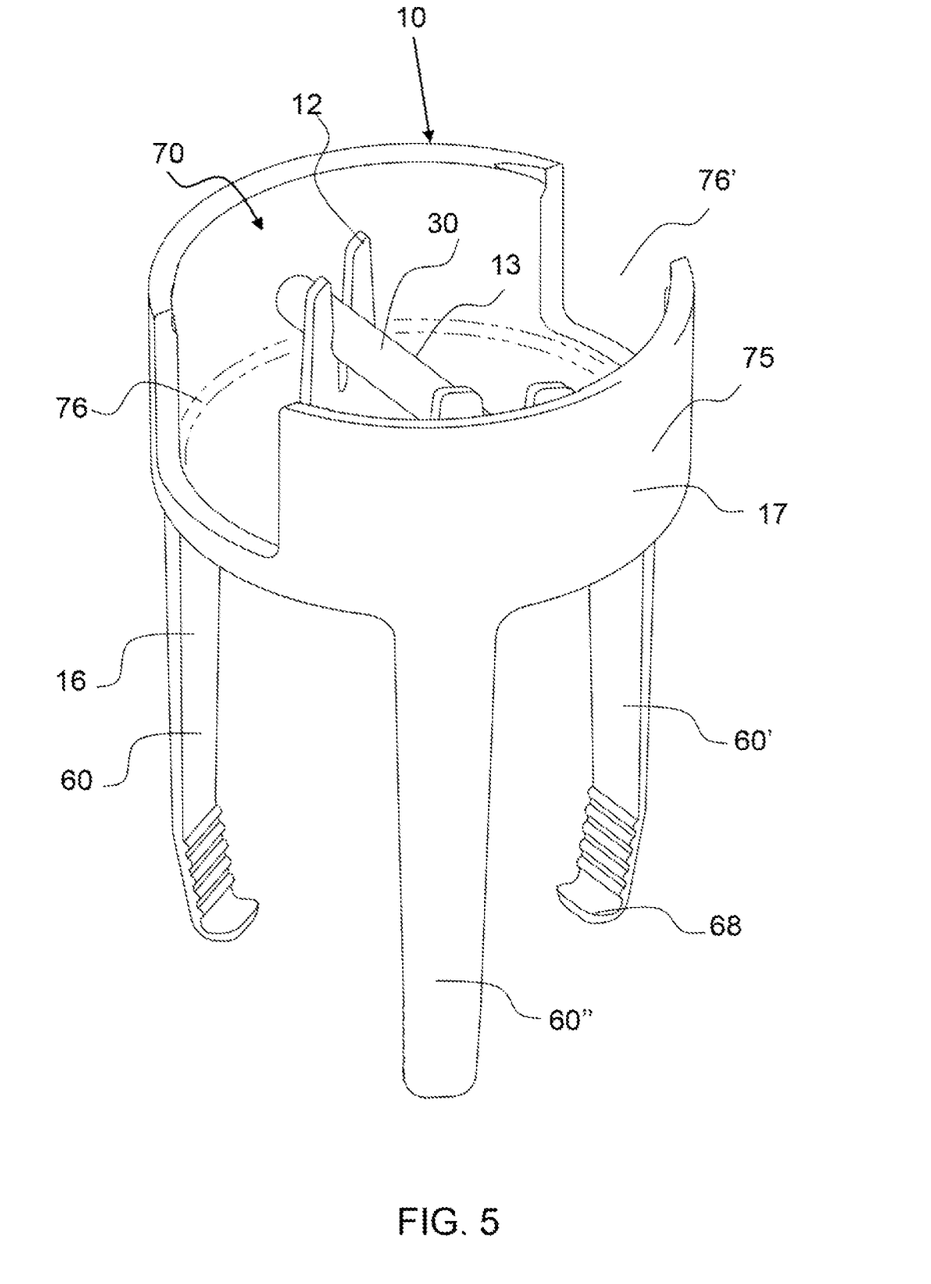
FIG. 5 shows an isometric view of an exemplary fish bite indicator having a light source configured within the interior volume of a body as described herein.

As shown in FIG. 5, an exemplary fish bite indicator 10 has a light source 13 configured within the interior volume 70 of a body 17. A glow-stick 30 type light source is shown in FIG. 5.

Figure 6:
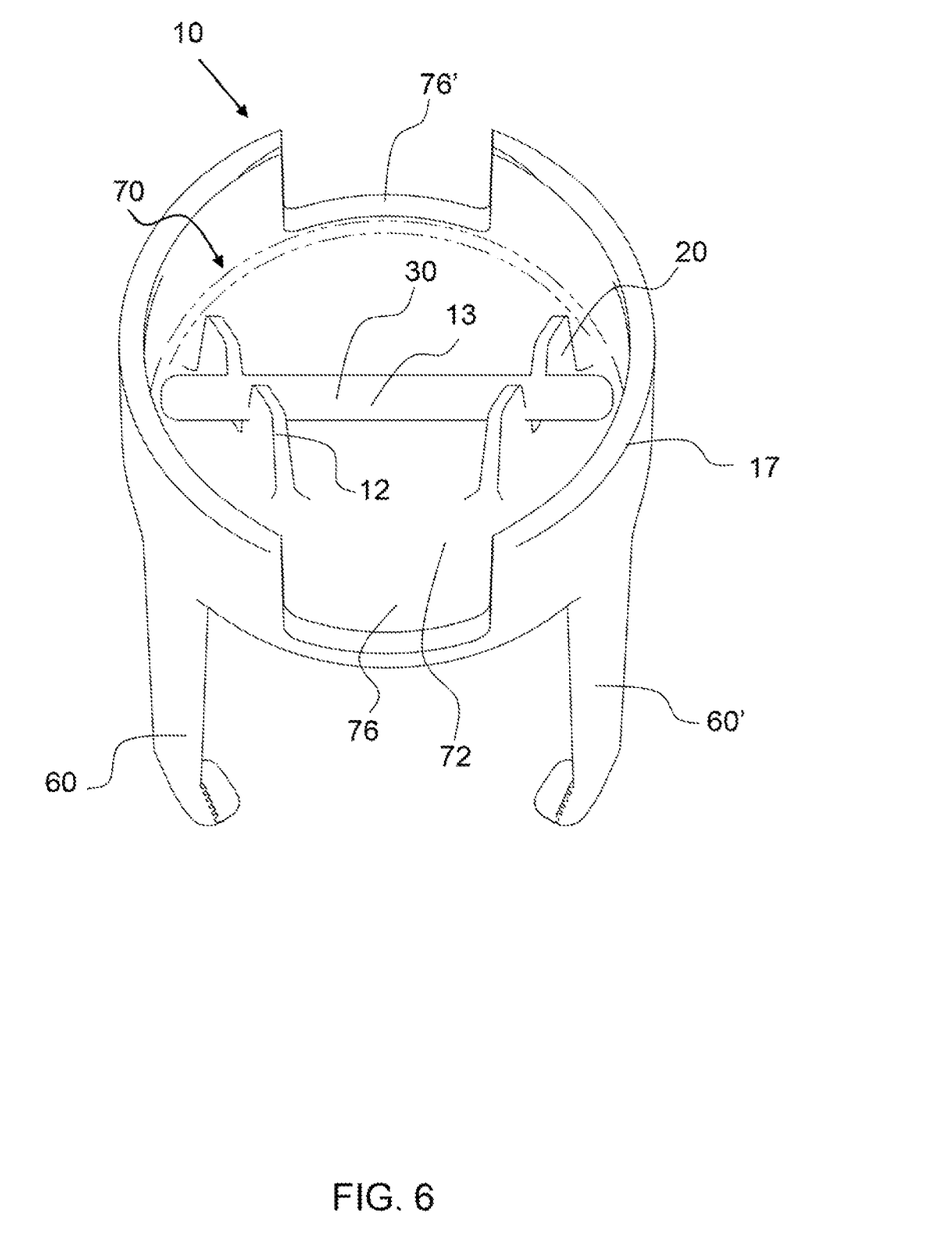
FIG. 6 shows a top-down isometric view of an exemplary fish bite indicator having a light source configured within the interior volume of a body as described herein.

As shown in FIG. 6 an exemplary fish bite indicator 10 has a light source 13 configured within the interior volume 70 of a body 17 as described herein.

Figure 7:
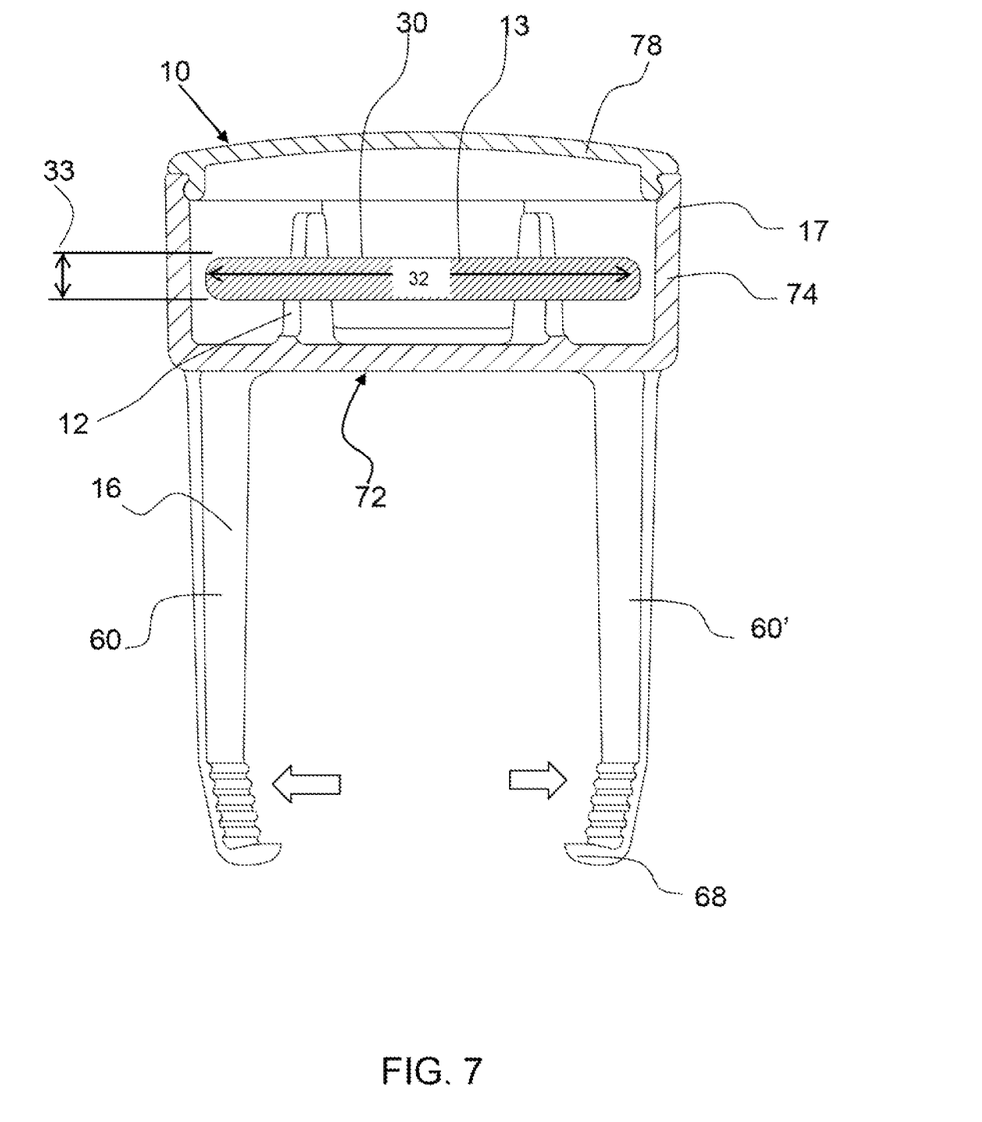
FIG. 7 shows a side cross-sectional view of the exemplary fish bite indicator shown in FIG. 3, taken along line AA.

As shown in FIG. 7 an exemplary fish bite indicator 10 comprises a light source 13 configured within the interior volume 70 of the body 17. The light source has a length 32 and width 33. The length direction of the light source extends along the length as shown by the arrowed dimension line overlaying the light source in FIG. 7. The base 72 of the body 17 is shown in FIG. 6. The light source attachment feature 12 is configured on the base 72.

Figure 8:
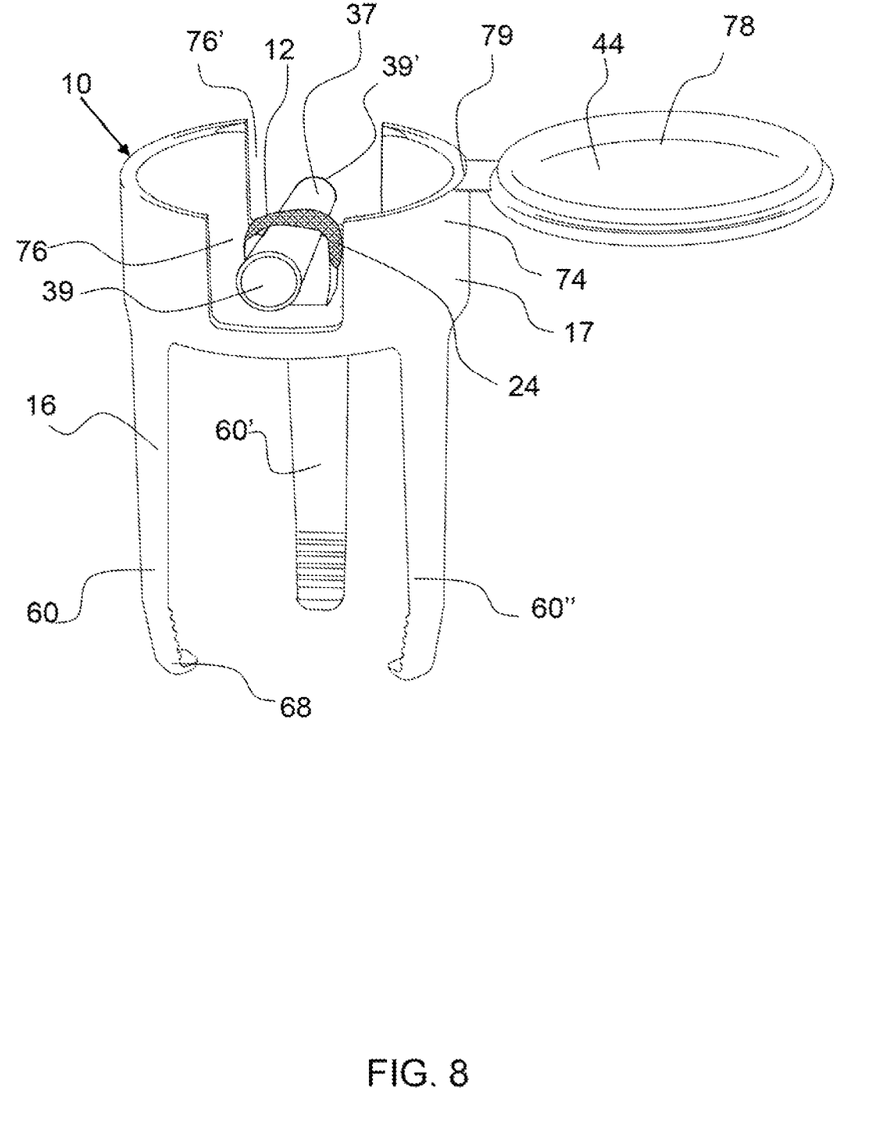
FIG. 8 shows an isometric view of an exemplary fish bite indicator having an LED light source configured within the interior volume of a body, and a cap coupled to the body by a hinge, as described herein.

As shown in FIG. 8 an exemplary fish bite indicator 10 has a light 37 type light source configured within the interior volume 70 of the body 17, and a cap 78 coupled to the body by a hinge 79. The light 37 is a (Light Emitting Diode) LED 39 type light having an LED on either end of the light 39, and 39'. The light is configured with the end aligned with the two openings 76, 76'. The opening 76 and 76' are configured 180 degrees from each other around the perimeter of the cylindrically shaped sides walls 74. The LED light may be powered by batteries configured within the light 37, not shown and the light may be water-proof or water resistant. An LED light may project a light further than a glow-stick configured with the fish bite indicator. Also shown in FIG. 8 is a light source attachment that comprises a retaining band 24. A reflective surface 44 is shown on the interior surface of the cap 78 in FIG. 8. A reflective coating or other reflective material may be applied to any portion of the fish bite indicator and specifically, may be applied to the interior surfaces of the body 17, such as the base, side walls, and cap.

Figure 9A:
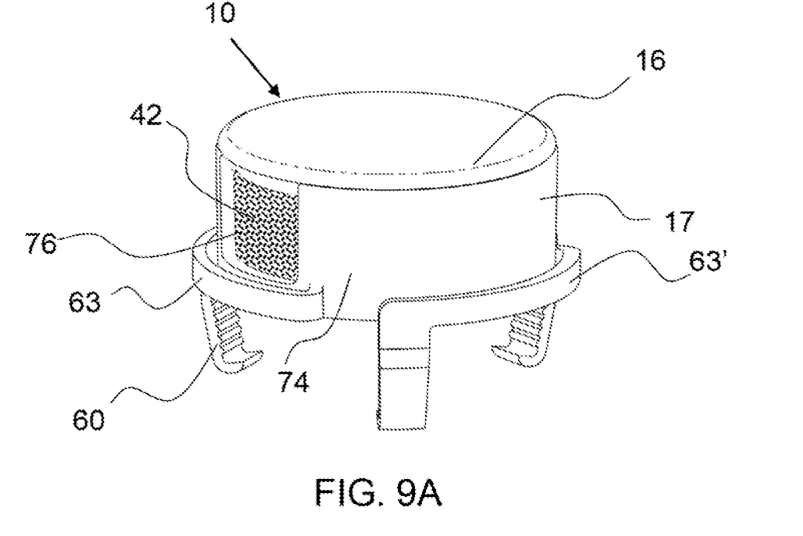
FIG. 9A shows a side isometric view of an exemplary fish bite indicator having three radial extensions, and a lens as described herein.
Figure 9B:
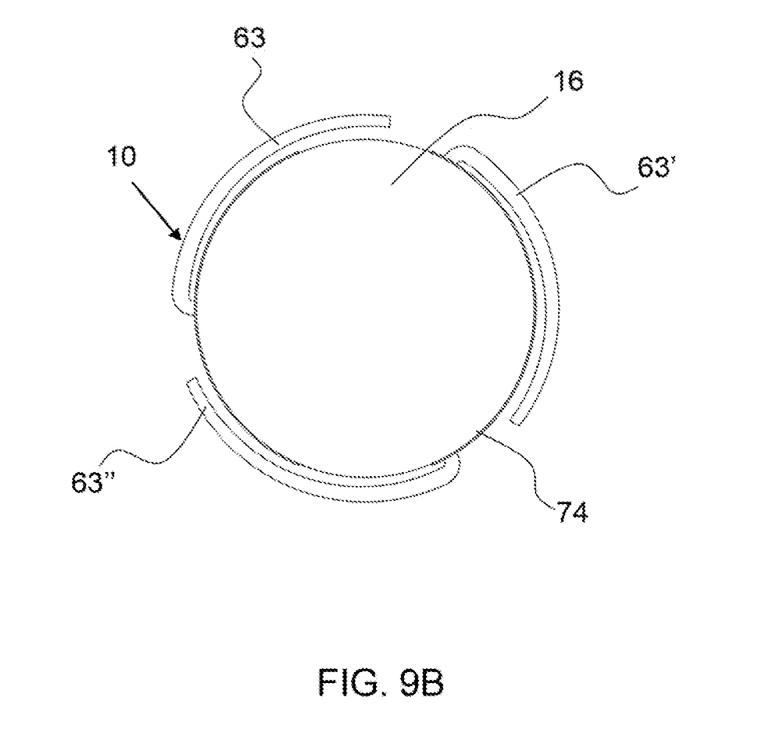
FIG. 9B shows a top-down view of the exemplary fish bite indicator shown in FIG. 9A.

As shown in FIG. 9A an exemplary fish bite indicator 10 has three radial extensions 63-63", and a lens 42 as described herein. The radial extensions 63 extend along the outer radius of the body 17, or along the exterior side walls 74. Each radial extension 63 comprises an attachment extension 60 that extends down from the body 17. The fish bite indicator shown in FIG. 9A, may be placed over a reel top and pressed to secure the attachment extensions to the reel top. The radial extensions may allow the attachment extensions to flex outward around the reel top. The opening 76 has a lens 42 configured therein. A lens may be any suitable type of lens including a Fresnel lens. The addition of a lens to an opening may enclose the interior volume of the body 17, thereby creating a sealed and substantially waterproof body. A lens may also increase the visibility of the light emitted from the fish bite indicator. FIG. 9B shows a top-down view of the exemplary fish bite indicator shown in FIG. 9A. Light tubes or light pipes, including fiber optic types, may also be configured in the fish bite indicator.

Figure 10:
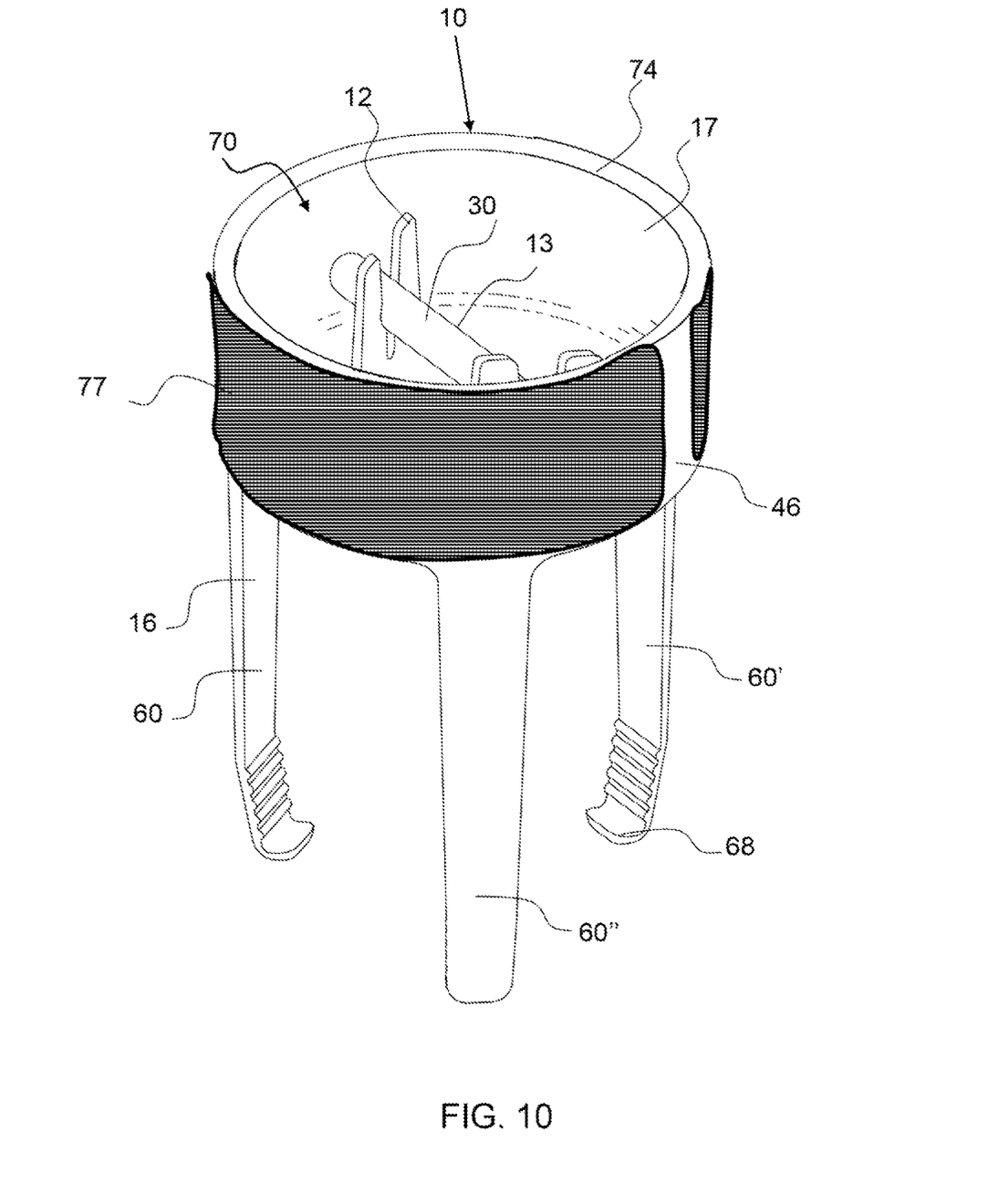
FIG. 10 shows an isometric view of an exemplary fish bite indicator having a light blocking feature configured on the exterior surface of the body and a light transparent portion.

As shown in FIG. 10, an exemplary fish bite indicator 10 has a light blocking feature 77 configured on the exterior surface of the body 17 and a light translucent portion 46. The light blocking feature 77 shown in FIG. 10 may be a sticker that has been adhered to the exterior surface of the side wall or may be a permanent feature of body wall 74. Any number of light blocking areas may be included and any number of open areas between light blocking areas may be configured to allow light transmission from the interior of the body to the exterior of the body. A light blocking feature may be applied to the interior volume and may simply be a strip of material that has substantially no light transmission therethrough. The side walls 74 of the body 17 may be made out of a clear or translucent plastic and/or opaque material. In one embodiment, a portion of the side walls are made from an opaque plastic and other portions are made with translucent plastic, thereby providing light transmission areas. With a cap snapped onto the body as shown in FIG. 10, the fish bite indicator may be substantially waterproof, whereby water cannot readily enter the interior of the body, or whereby the body has no openings.

Figure 11:
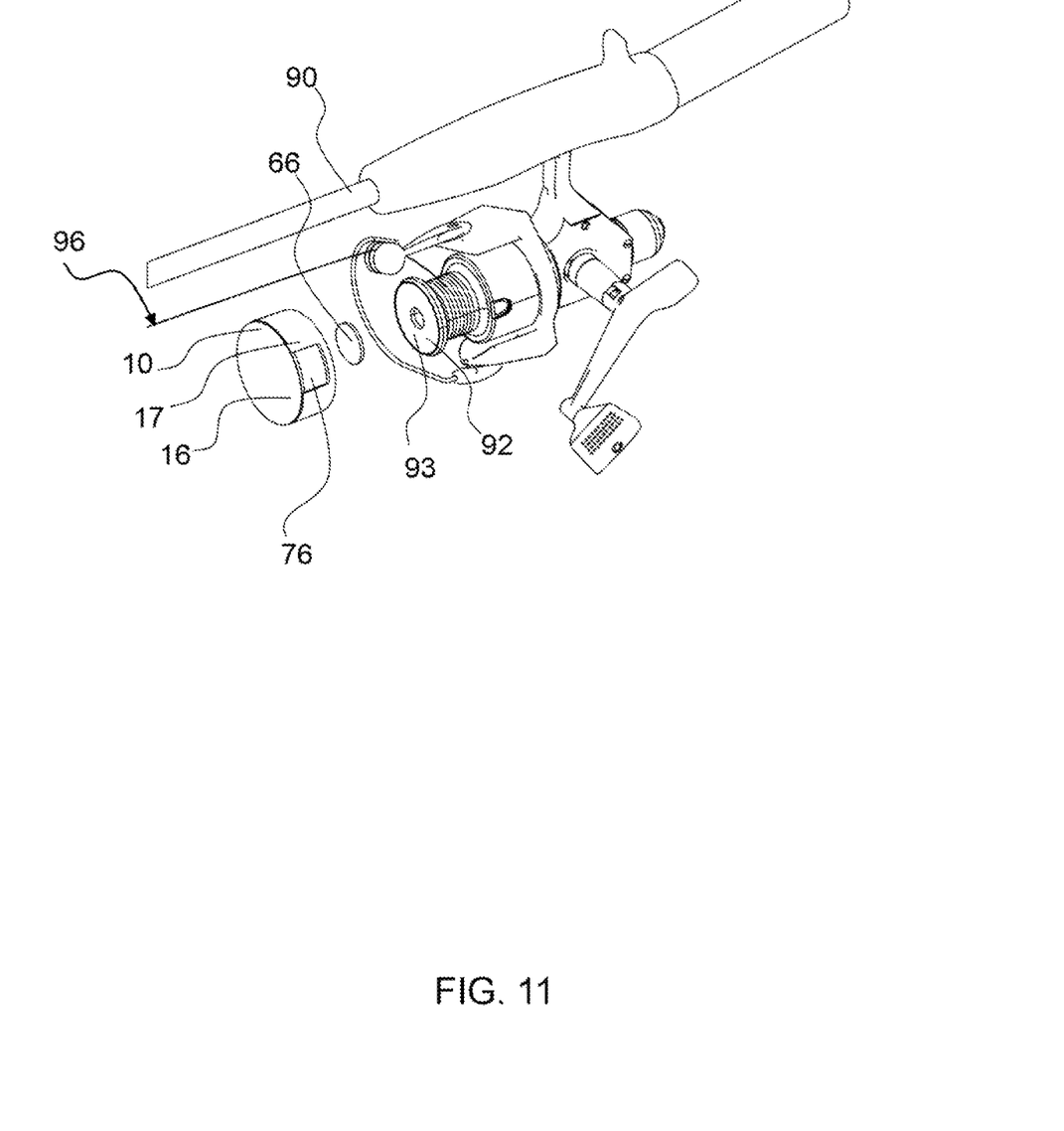
FIG. 11 shows an isometric exploded view of an exemplary fish bite indicator having a magnet for attachment to a fishing reel as described herein.

As shown in FIG. 11 an exemplary fish bite indicator 10 has a magnet 66 for attachment to a fishing reel 92 as described herein. A portion of the light source attachment feature or body may be configured between the magnet and the reel top 93. The magnet may hold the fish bite indicator to the reel and preferably to the reel top. The reel top 93 has a planar surface that is the same as the plane of rotation of the reel.

Figure 12:
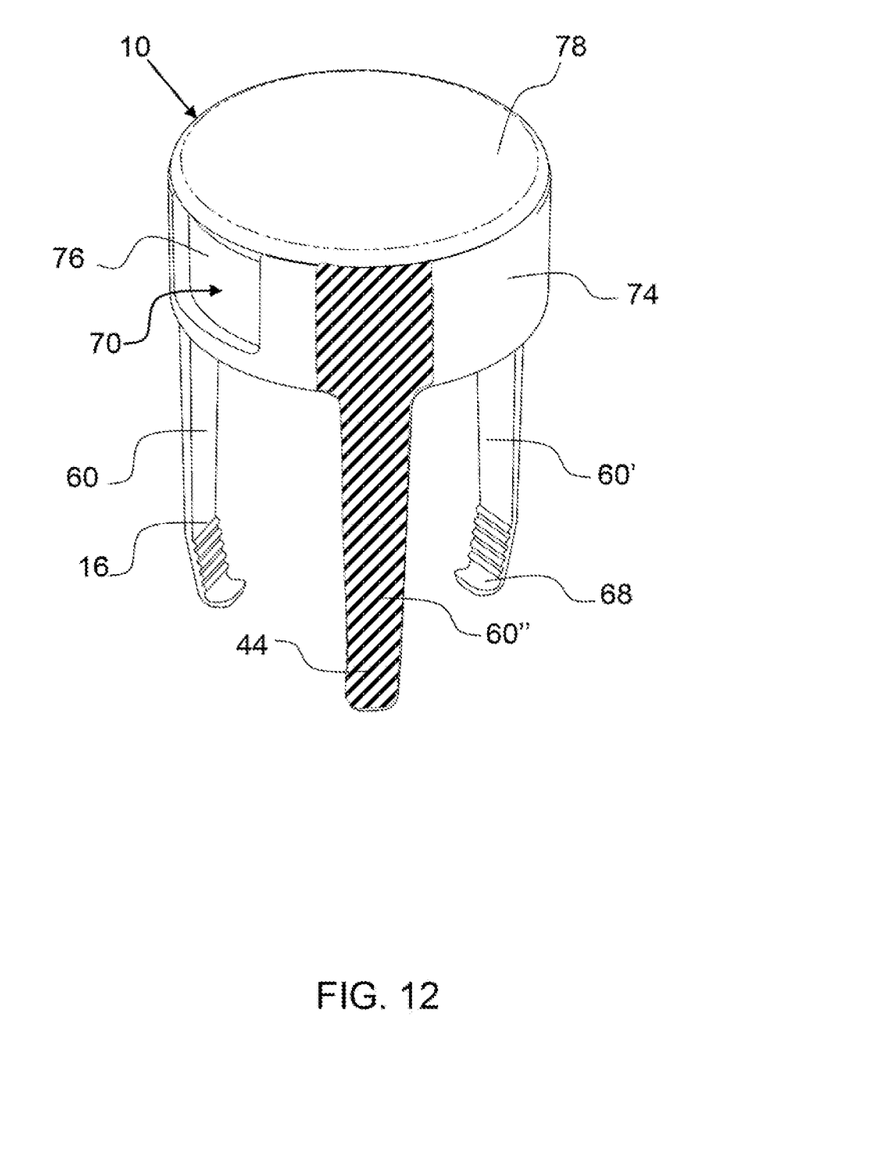
FIG. 12 shows an isometric view of an exemplary fish bite indicator having a reflective outer surface portion.

As shown in FIG. 12 an exemplary fish bite indicator has a reflective outer surface portion. A change in color or reflective properties of the outer surface of the fish bite indicator, and specifically body and reel attachment feature, may provide for indication of a fish bite during daylight hours. The alternating color or reflective surface may more effectively catch an angler's attention when the reel and fish bite indicator spin.

DEFINITIONS

Translucent, as used herein, means at least translucent and includes transparent materials as well.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents

What is claimed is:

1. A flashing light fish bite indicator comprising:
a light source;
a body that is separate from the light source and comprising:
  a base;
  a reel attachment feature;
  a light source attachment feature;
wherein the light source is detachably attached to said light source attachment feature;
  at least one opaque side wall that extends up from the base of the body and extends up beyond said light source to substantially block an emitted light from said light source;
wherein the flashing light fish bite indicator is detachably attached to a reel top of a reel by the reel attachment feature; and
whereby in use, with the reel attached to a fishing rod and a fishing line wrapped around the reel, the flashing light fish bite indicator automatically rotates when the fishing line is drawn out from the reel, thereby rotating the light source and the at least one opaque wall to create a flashing light and thereby indicate that the fishing line is being drawn from the reel.

2. The flashing light fish bite indicator of claim 1, wherein the fish bite indicator is integral with the reel.

3. The flashing light fish bite indicator of claim 1, wherein the light source has a length and a length direction, wherein the light source attachment feature is configured to retain the light source with the length direction substantially parallel with a plane of rotation of the reel.

4. The flashing light fish bite indicator of claim 1, wherein sides of the body comprise at least one translucent portion.

5. The flashing light fish bite indicator of claim 1, the reel attachment feature further comprising a magnet for the attachment of the fish bite indicator to a reel.

6. The flashing light fish bite indicator of claim 1, wherein the light source is a chemical glow-stick.

7. The flashing light fish bite Indicator of claim 1, wherein the light source comprises at least one light emitting diode.

8. The flashing light fish bite indicator of claim 1, further comprising at least one lens.

9. The flashing light fish bite indicator of claim 1, wherein the body comprises:
   an interior volume defined by the at least one opaque side wall; and
   at least one opening in said opaque side wall;
   wherein the light source attachment feature is configured within said interior volume of said body;
   whereby in use, when the reel rotates from the fishing line being drawn out from the reel, said body which has the light source attached within automatically rotates and said at least one opening rotates to create the flashing light that, to an observer, indicates that the fishing line is being drawn from the reel.

10. The flashing light fish bite indicator of claim 9, further comprising reflective surfaces on at least a portion of the body.

11. The flashing light fish bite indicator of claim 9, wherein the at least one opaque wall has a cylindrical shape that extends around the light source to substantially form an enclosure around the light source with the at least one opening.

12. The flashing light fish bite indicator of claim 9, wherein the body comprises a cap.

13. The flashing light fish bite indicator of claim 12, wherein the cap is detachably attachable to the body.

14. The flashing light fish bite indicator of claim 12, wherein the body is substantially waterproof.

15. A flashing light fish bite indicator comprising:
a light source;
a body, that is a separate light source, comprising;
   a base;
   at least one opaque side wall that extends up beyond said light source to substantially block an emitted light from said light source and that defines an interior volume and an enclosure for said light source:
   a light source attachment feature configured within the interior volume of the body;
   at least one opening in said at least one opaque side wall; and
   a reel attachment feature;
wherein the fish bite indicator is detachably attached to a reel top of a spinning reel by said reel attachment feature;
wherein the light source is detachably attached to said fish bite indicator by said light source attachment feature,
whereby in use, with the spinning reel attached to a fishing rod and a fishing line wrapped around the reel, the flashing light fish bite indicator automatically rotates when the fishing line is drawn out from the spinning reel, thereby rotating the light source, the at least one opaque side wall and the at least one opening to create a flashing light and to indicate that a fishing line is being drawn from the reel;
wherein the light source has a length and a length direction and wherein the light source attachment feature is configured to retain the light source with the length direction substantially parallel with a plane of rotation of the reel.

16. The flashing light fish bite indicator of claim 15, wherein the at least one opaque wall has a cylindrical shape that extends around the light source to substantially form the enclosure around the light source with the at least one opening configured to allow a light emitted from the light source to project out from said enclosure; and
   wherein the reel attachment feature comprises a plurality of attachment extensions that detachably attach the fish bite indicator to the reel top.

* * * * *